S. H. HILL.
DROPPER ATTACHMENT FOR CULTIVATORS.
APPLICATION FILED APR. 25, 1911.

1,018,709.

Patented Feb. 27, 1912.

Inventor
Samuel H. Hill

Witnesses
W. N. Woodson
Juana M. Fallin

By
H. A. K. Facer, Attorneys.

COLUMBIA PLANOGRAPH CO., WASHINGTON, D. C.

UNITED STATES PATENT OFFICE.

SAMUEL H. HILL, OF KEENER, ALABAMA, ASSIGNOR OF ONE-HALF TO JAMES S. HILL, OF KEENER, ALABAMA.

DROPPER ATTACHMENT FOR CULTIVATORS.

1,018,709.      Specification of Letters Patent.      Patented Feb. 27, 1912.

Application filed April 25, 1911. Serial No. 623,284.

*To all whom it may concern:*

Be it known that I, SAMUEL H. HILL, citizen of the United States, residing at Keener, in the county of Etowah and State of Alabama, have invented certain new and useful Improvements in Dropper Attachments for Cultivators, of which the following is a specification.

This invention relates to dropper attachments for cultivators, and has for its object to provide a simple and effective mechanism easily applied and detached from the frame of a cultivator, whereby a standing crop may be fertilized at the same time that it is being cultivated.

With this object in view the attachment includes a hopper having its bottom opening closed by a pivoted chute. An arm is attached to the chute and is arranged to engage tappets mounted at the sides of a wheel which is applied to the forward portion of the frame of the cultivator to assist in supporting the same. A lever mechanism is provided for lifting said arm above the path of movement of the said tappets, whereby the said chute is not swung as the wheel rotates. A funnel shaped member is arranged to receive material from the delivery end of the chute and convey the same to a tube which is mounted upon the frame of the cultivator and its discharge end positioned behind any particular shovel of the said cultivator.

Figure 1:
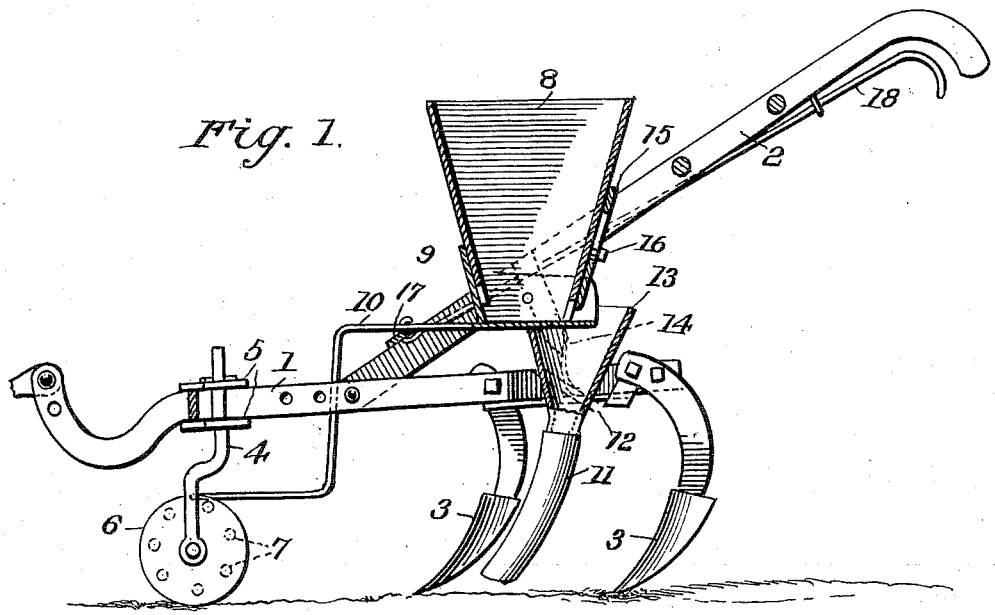
Figure 2:
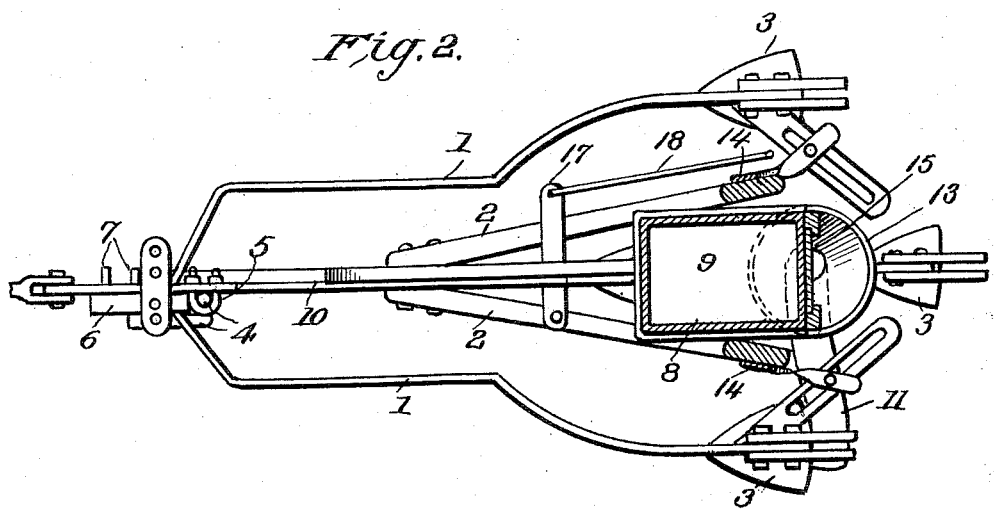

For a full understanding of the invention reference is to be had to the following description and accompanying drawing, in which:

Figure 1 is a longitudinal vertical view of a cultivator with the dropper applied; Fig. 2 is a top plan view of the same.

Corresponding and like parts are referred to in the following description and indicated in all the views of the accompanying drawings by the same reference characters.

The cultivator to which the attachment is intended to be applied includes a frame 1 having the usual handles 2 and which carries cultivator shovels 3 of any desired or approved pattern.

The attachment in part includes a bracket 4 which is held in position at the forward portion of the frame 1 by means of a clamp 5. A wheel 6 is journaled at the lower end of the bracket 4 and is provided upon one side with a series of tappets or pins 7.

A hopper 8 is fixedly positioned over the frame 1 between the handles 2 and its lower end is closed by a pivoted chute 9. The delivery end of the chute 9 is rearwardly disposed. The rear end of an arm 10 is fixed to the chute 9 and the said arm extends forwardly and downwardly and again forwardly with its forward extremity normally lying in the path of movement of the tappets 7 carried by the wheel 6.

A tube 11 is held in position upon the rear portion of the frame 1 by means of a clamping device 12 of any desired pattern. The lower end of the tube 11 is located behind any particular shovel 3 carried by the frame 1. The tube 11 carries a funnel shaped member 13, and at its forward portion the funnel shaped member is cut away as at 14 and the discharge end of the chute 9 is received between the opposite side portions of the funnel shaped member 13 at the space 14 provided at the forward portion thereof.

A gate 15 is slidably mounted at the rear side of the hopper 8 and is held in an adjusted position by means of a clamp nut 16, so that the lower edge of the said gate may be positioned at any desired distance from the upper surface of the rear portion of the pivoted chute 9. A bar 17 is pivoted to one of the handles 2, and the intermediate portion of the said bar lies under the arm 10. The free end of the said bar lies over the other handle 2 and the lower end of a rod 18 is pivotally connected with the free end portion of the bar 17 and extends up to within convenient reach of one gripping the upper extremity of the handle 2 upon which the said rod is mounted.

From the above description it will be seen that at the time that a crop of standing plants is being cultivated, fertilizer may be dropped in the furrows adjacent the same, for as the cultivator is drawn along the row, the forward end portion of the arm 10 is encountered successively by the tappets 7 as the wheel 6 rotates and the chute 9 is swung under the lower end of the hopper 8. Therefore the space between the delivery end portion of the bottom of the said chute and the lower edge of the gate 15 is constantly increasing and diminishing, and therefore the material will flow from the hopper 8 down along the chute 9 into the funnel member 13, from whence it is directed into the tube 11 and carried to the furrow opened by one of the points 3. If at any time it should be desired to quickly check the flow of the fertilizer, the operator draws the rod 18 longitudinally, whereby the bar 17 is swung upon its pivot and the arm 10 is lifted so that its forward portion is above the path of movement of the tappets 7 carried at the side of the wheels 6. Thus the chute 9 will come to a state of rest with relation to the hopper 8 and the material will clog between the bottom of the chute and the lower edge of the gate 15 and cease to flow from the chute into the funnel member 13.

Having thus described the invention, what is claimed as new is:

A dropper attachment for cultivators comprising a wheel supporting the forward end of the cultivator frame and carrying tappets, a hopper fixed in upright position between the handles of the cultivator at a point between the ends thereof and above the furrow opener, a chute pivoted to the hopper, an arm fixed to the chute and having a free end portion normally lying in the path of movement of the tappets, a bar located upon the forward inclined portions of the handles in front of the hopper and pivoted to one of the handles and having a free end portion lying across the other handle, with the intermediate portion lying under and in contact with said arm, and a rod pivotally connected at its forward end with the free end of the bar and extending back to the grip of one of the handles.

In testimony whereof, I affix my signature in presence of two witnesses.

SAMUEL H. HILL. [L. S.]

Witnesses:
JEFF GRAY,
J. S. HILL.

---

Copies of this patent may be obtained for five cents each, by addressing the "Commissioner of Patents, Washington, D. C."